United States Patent
Choi et al.

(10) Patent No.: US 8,243,131 B2
(45) Date of Patent: Aug. 14, 2012

(54) CONTACTLESS TYPE OF FINGERPRINT IMAGE OBTAINING APPARATUS USING MIRROR

(75) Inventors: Heeseung Choi, Gyeonggi-do (KR); Kyoungtaek Choi, Seoul (KR); Jaihie Kim, Gyeonggi-do (KR)

(73) Assignees: Industry-Academic Cooperation Foundation, Yonsei University, Seoul (KR); Suprema Inc., Gyeonggi-Do (KR)

( * ) Notice: Subject to any disclaimer, the term of this patent is extended or adjusted under 35 U.S.C. 154(b) by 489 days.

(21) Appl. No.: 12/521,544

(22) PCT Filed: Dec. 17, 2007

(86) PCT No.: PCT/KR2007/006588
§ 371 (c)(1),
(2), (4) Date: Jun. 26, 2009

(87) PCT Pub. No.: WO2008/078895
PCT Pub. Date: Jul. 3, 2008

(65) Prior Publication Data
US 2010/0315498 A1  Dec. 16, 2010

(30) Foreign Application Priority Data
Dec. 26, 2006 (KR) .................. 10-2006-0133715

(51) Int. Cl.
*H04N 7/18* (2006.01)
*G06K 9/00* (2006.01)

(52) U.S. Cl. ........... 348/77; 382/124; 382/125; 382/126

(58) Field of Classification Search .......... 348/77; 382/124–126
See application file for complete search history.

(56) References Cited

U.S. PATENT DOCUMENTS

| 5,177,802 A * | 1/1993 | Fujimoto et al. ........... 382/124 |
| 5,548,394 A | 8/1996 | Giles et al. |
| 2002/0106115 A1 * | 8/2002 | Rajbenbach et al. ........ 382/126 |
| 2004/0041998 A1 * | 3/2004 | Haddad .................. 356/71 |
| 2004/0179723 A1 * | 9/2004 | Sano et al. ............... 382/124 |
| 2005/0117784 A1 * | 6/2005 | Merbach et al. ........... 382/124 |
| 2006/0056661 A1 * | 3/2006 | Einighammer et al. ..... 382/115 |

FOREIGN PATENT DOCUMENTS
JP  2006-197981  8/2006
* cited by examiner

Primary Examiner — Mehrdad Dastouri
Assistant Examiner — Mohammed Rahaman
(74) Attorney, Agent, or Firm — Rabin & Berdo, P.C.

(57) ABSTRACT

Provided is a contactless fingerprint image obtaining apparatus using a mirror. The contactless fingerprint image obtaining apparatus obtains the entire region of a fingerprint using the mirror in a contactless manner. The entire region of the fingerprint includes a fingerprint region of the front direction coinciding with the optical axis of a single shooting unit, and fingerprint regions of left/right lateral sides that do not coincide with the optical axis. Accordingly, unwillingness of a user, distortion caused by contact of the user, quality reduction, which are the limitations of a related art contact type fingerprint image obtaining apparatus are solved. Simultaneously, a wide region of a fingerprint image including the lateral sides of a fingerprint that cannot be directly obtained by a related art contactless fingerprint image obtaining apparatus using only a single camera can be economically obtained.

10 Claims, 3 Drawing Sheets

CONTACTLESS TYPE OF FINGERPRINT IMAGE OBTAINING APPARATUS USING MIRROR

TECHNICAL FIELD

The present invention relates to a fingerprint image obtaining apparatus that can be applied to identification and authentication of various fields requiring security, and more particularly, to a contactless fingerprint image obtaining apparatus using a mirror, that obtains a fingerprint region beyond the limit of the shooting range of a shooting unit such as a camera in a contactless manner using the mirror.

BACKGROUND ART

Generally, a fingerprint identification system is relatively excellent in aspects of price and performance compared to other biometric identification system, and thus is widely used.

However, in a contact type fingerprint image obtaining apparatus used for an existing fingerprint identification system, a user feels unwillingness, fingerprint is distorted during contact, fingerprint image quality changes due to an environment and a user's skin condition, so that fingerprint identification performance may be reduced.

Meanwhile, to solve the limitations of a related art contact type fingerprint image obtaining apparatus, contactless fingerprint image obtaining apparatuses obtaining an image without finger contact of a user with the fingerprint image obtaining apparatus have been proposed.

For example, U.S. Pat. No. 6,404,904 titled system for the touchless recognition of hand and finger lines discloses technology related to a fingerprint image obtaining apparatus shooting a fingerprint without contact using a charge coupled device (CCD) camera in order to obtain a user's fingerprint image.

However, since the fingerprint image obtaining apparatus by U.S. Pat. No. 6,404,904 can obtain only a fingerprint region of a partial front direction covered by the CCD camera due to the bending of a fingerprint, it cannot obtain a fingerprint image on a wide area. Also, it is difficult to expect uniform quality over an entire fingerprint region due to resolution reduction in the lateral region of the fingerprint that does not coincide with the optical axis of the camera.

Also, United States Patent Publication No. 2005/0117784 titled System for high contrast contactless representation of strips of the skin discloses an apparatus shooting the entire portion of a user's finger using seven cameras, and illuminating light from a position where the camera exists to a direction facing the finger to obtain the entire region of a fingerprint.

However, since the fingerprint image obtaining apparatus by United States Patent Publication No. 2005/0117784 uses many cameras and lights, it is not economical and increases in its size.

DISCLOSURE OF THE INVENTION

Technical Problem

An object of the present invention is to provide a contactless fingerprint image obtaining apparatus using a mirror that uses one single shooting unit such as a camera and obtains the entire region of a fingerprint using the mirror, the entire region of the fingerprint including a fingerprint region of a front direction covered by the field of vision of the single shooting unit, that is, the front direction that coincides with the optical axis of the shooting unit, and a fingerprint region beyond the limit of the shooting range of the single shooting unit, that is, the fingerprint region on left and right sides that does not coincide with the optical axis of the shooting unit.

Technical Solution

According to an aspect of the present invention, there is provided a contactless fingerprint image obtaining apparatus using a mirror, the apparatus including: a finger support supporting a finger of a user to prevent the finger from shaking; a pair of mirrors installed at a slope angle above both lateral sides of the finger supported by the finger support, the mirrors illuminating regions of a fingerprint on left and right lateral sides; a single camera fixedly installed apart from the finger by a predetermined distance below the finger supported by the finger support, the single camera being disposed at a position allowing shooting an entire region including a fingerprint region of a front direction coinciding with an optical axis of the camera, and fingerprint regions of left and right lateral sides that do not coincide with the optical axis; a lighting unit installed between the finger supported by the finger support and the camera, and illuminating light on the fingerprint region of the user; a scattering unit allowing light illuminated by the lighting unit to be uniformly spread and distributed over the finger; and an operating switch installed in front of the finger supported by the finger support, and on/off-operated by a pressing operation of the finger to on/off-control operations of the camera and the lighting unit.

According to another aspect of the present invention, there is provided a contactless fingerprint image obtaining apparatus using a mirror, the apparatus including: a finger support supporting a finger of a user to prevent the finger from shaking; a pair of mirrors installed at a slope angle above both lateral sides of the finger supported by the finger support, the mirrors illuminating regions of a fingerprint on left and right lateral sides; a single camera installed to be movable to left and right, apart from the finger by a predetermined distance below the finger supported by the finger support, the single camera being disposed at a position allowing shooting an entire region while moving to left and right, the entire region including a fingerprint region of a front direction coinciding with an optical axis of the camera, and fingerprint regions of left and right lateral sides that do not coincide with the optical axis; a camera moving unit moving the camera to left and right; a lighting unit installed between the finger supported by the finger support and the camera, and illuminating light on the fingerprint region of the user; a scattering unit located above the lighting unit and allowing light illuminated by the lighting unit to be uniformly spread and distributed over the finger; and an operating switch installed in front of the finger supported by the finger support, and on/off-operated by a pressing operation of the finger to on/off-control operations of the camera, the camera moving unit, and the lighting unit.

According to still another aspect of the present invention, there is provided a contactless fingerprint image obtaining apparatus using a mirror, the apparatus including: a finger support supporting a finger of a user to prevent the finger from shaking; a pair of mirrors installed at a slope angle above both lateral sides of the finger supported by the finger support, the mirrors illuminating regions of a fingerprint on left and right lateral sides; a pair of cameras installed to be movable to left and right, apart from the finger by a predetermined distance below the finger supported by the finger support, one camera being disposed at a position allowing shooting a portion of a fingerprint including a fingerprint region of a front direction coinciding with an optical axis of the camera and a fingerprint region of a left lateral side that does not coincide with the optical axis, and the other camera being disposed at a position allowing shooting a portion of a fingerprint including the fingerprint region of the front direction coinciding with the optical axis and a fingerprint region of a right lateral side that does not coincide with the optical axis; a lighting unit installed between the finger supported by the finger support and the pair of cameras, and illuminating light on the fingerprint region of the user; a scattering unit located above the lighting unit and allowing light illuminated by the lighting unit to be uniformly spread and distributed over the finger; and an operating switch installed in front of the finger supported by the finger support, and on/off-operated by a pressing operation of the finger to on/off-control operations of the cameras and the lighting unit.

The details of one or more embodiments are set forth in the accompanying drawings and the description below. Other features will be apparent from the description and drawings, and from the claims.

Advantageous Effects

As described above, when an entire fingerprint image is obtained in a contactless manner using a single shooting unit and a mirror which is relatively cheaper than a shooting unit such as a camera according to the present invention, unwillingness of a user, distortion caused by contact of the user, quality reduction, which are the limitations of a related art contact type fingerprint image obtaining apparatus are solved. Simultaneously, a wide region of a fingerprint image including the lateral sides of a fingerprint that cannot be directly obtained by a related art contactless fingerprint image obtaining apparatus using only a single camera can be economically obtained. Compared to a related art contactless fingerprint image obtaining apparatus using many cameras and lighting units, the contactless fingerprint image obtaining apparatus according to the present invention is economical in an aspect of price, and can be miniaturized even more.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

The first embodiment of the present invention is described in detail with reference to the accompanying drawings.

Figure 1:
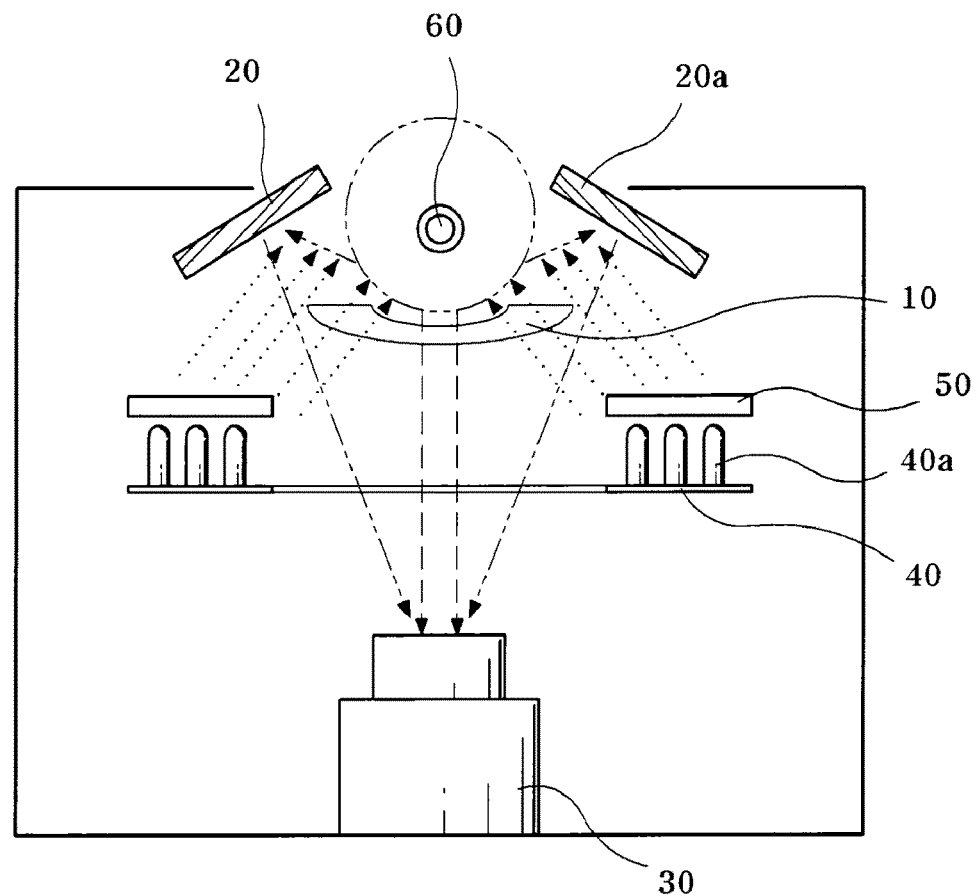
FIG. 1 is a view of a contactless fingerprint image obtaining apparatus using a mirror according to a first embodiment of the present invention.
Figure 2:
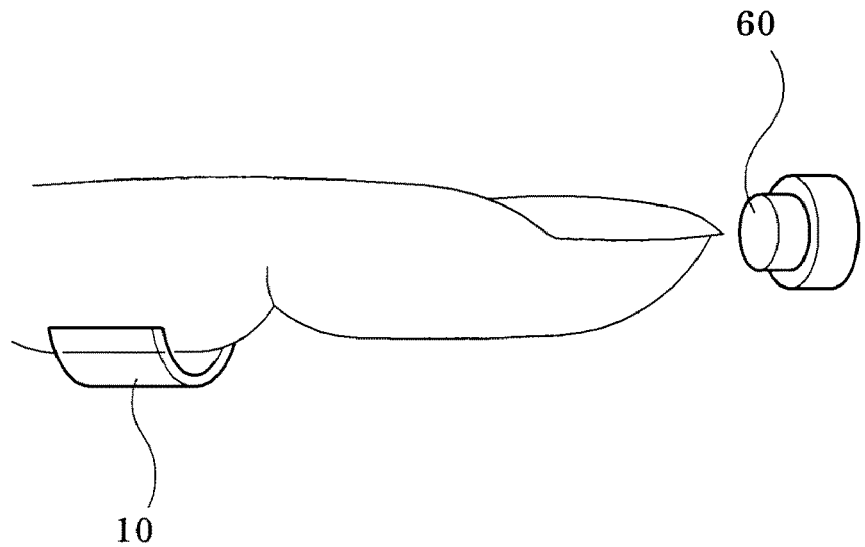
FIG. 2 is a side view illustrating the finger support and an operating switch of FIG. 1.
Figure 3:
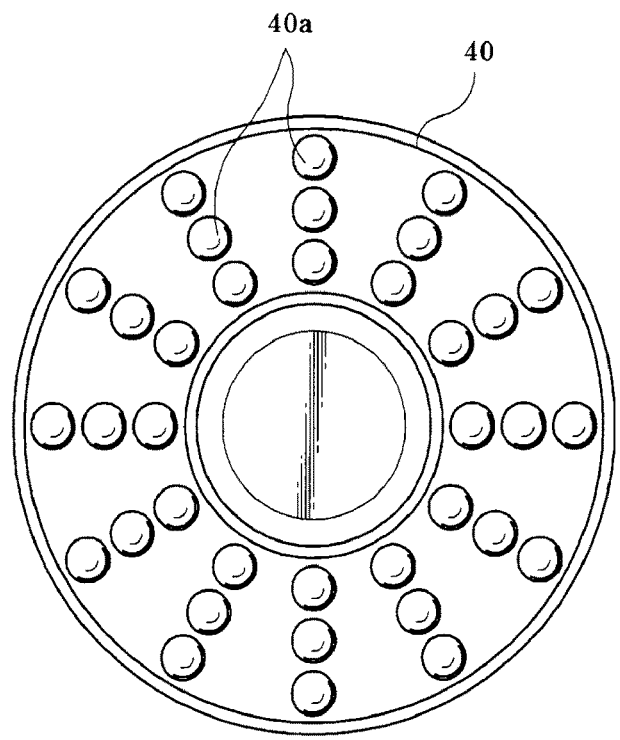
FIG. 3 is a plan view illustrating the lighting unit of FIG. 1.

Referring to FIGS. 1 to 3, a finger support 10 supports a finger of a user to prevent the finger from shaking.

The finger support 10 can have a shape such as a semicircular shape and a semi-elliptical shape similar to the curved surface of a finger.

A pair of mirrors 20 and 20a is installed at a slope angle above both lateral sides of the finger supported by the finger support 10, to illuminate regions of a fingerprint on left and right lateral sides.

The pair of mirrors 20 and 20a is used to obtain an image of a fingerprint region on left and right lateral sides that cannot be directly shot by a camera 30.

The single camera 30 is fixedly installed apart from the finger by a predetermined distance below the finger supported by the finger support 10. The single camera 30 is disposed at a position allowing shooting an entire region including a fingerprint region of a front direction coinciding with an optical axis of the camera, and fingerprint regions of left and right lateral sides that do not coincide with the optical axis.

A lighting unit 40 is installed between the finger supported by the finger support 10 and the camera 30, and illuminates light (e.g., green light and blue light) on the fingerprint region of the user.

Referring to FIG. 3, the lighting unit 40 includes a plurality of short wavelength band emission layers 40a circularly arranged around the finger of the user to illuminate a fingerprint region. All or some of the short wavelength band emission layers 40a can be used.

A scattering unit 50 allows light illuminated by the lighting unit 40 to be uniformly spread and distributed over the finger.

An operating switch 60 is installed in front of the finger supported by the finger support 10, and on/off-operated by a pressing operation of the finger to on/off-control the operations of the camera 30 and the lighting unit 40.

The operating switch 60 can be a micro switch and a light sensor having a curved surface shape or a circular shape of a finger end to prevent the finger from shaking.

As illustrated in FIG. 1, the contactless fingerprint image obtaining apparatus according to the first embodiment of the present invention having the above construction is used to obtain one fingerprint image representing all of the front side and the left/right lateral sides with respect to the entire region of the fingerprint in the case where the shooting range of a shooting unit, i.e., the camera 30 includes a fingerprint region of the front direction coinciding with the optical axis of the camera 30 and the fingerprint regions of the left/right lateral sides that do not coincide with the optical axis. The contactless fingerprint image obtaining apparatus operates in the following manner.

Referring to FIG. 2, when the operating switch 60 is pressed with the finger of the user supported by the finger support 10, the camera 30 and the lighting unit 40 start to operate.

Accordingly, short wavelength band light such as green light and blue light illuminated from the lighting unit 40 is uniformly spread by the scattering unit 50 and illuminated onto the fingerprint region of the user.

Figure 6:
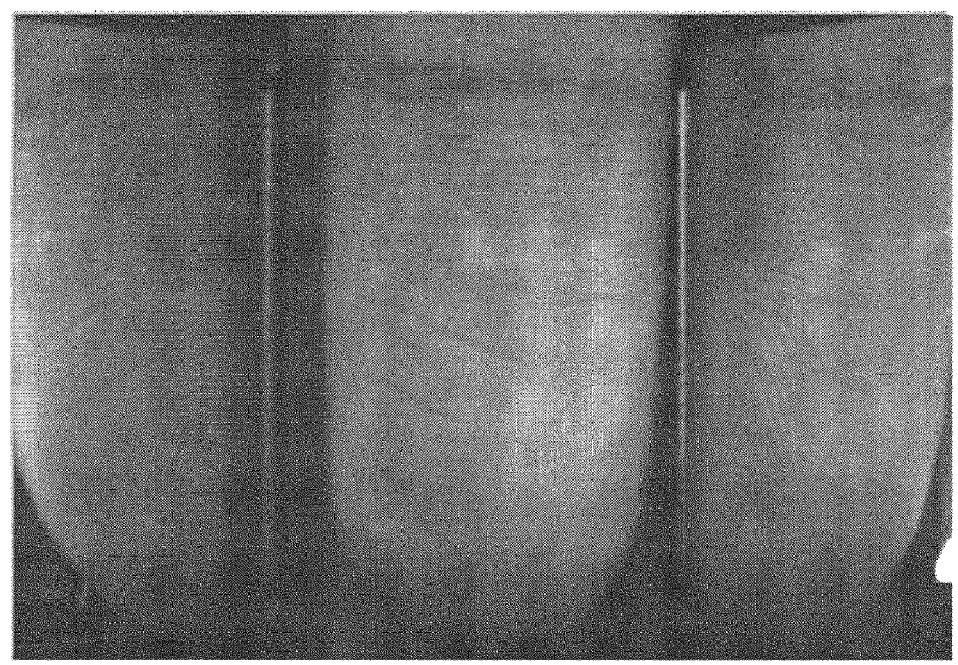
FIG. 6 is a photo illustrating a fingerprint image obtained by the contactless fingerprint image obtaining apparatus using the mirror according to the first to third embodiments of the present invention.

At this point, the camera 30 fixedly installed apart from the finger of the user by a predetermined distance obtains one fingerprint image (refer to FIG. 6) representing all of the front side and the left/right lateral sides with respect to the entire region of the fingerprint including a fingerprint region of the front direction coinciding with the optical axis and the fingerprint regions of the left/right lateral sides that do not coincide with the optical axis. The above obtained fingerprint image is utilized for identification and authentication of various fields requiring security.

A second embodiment of the present invention is described in more detail with reference to the accompanying drawings.

Figure 4:
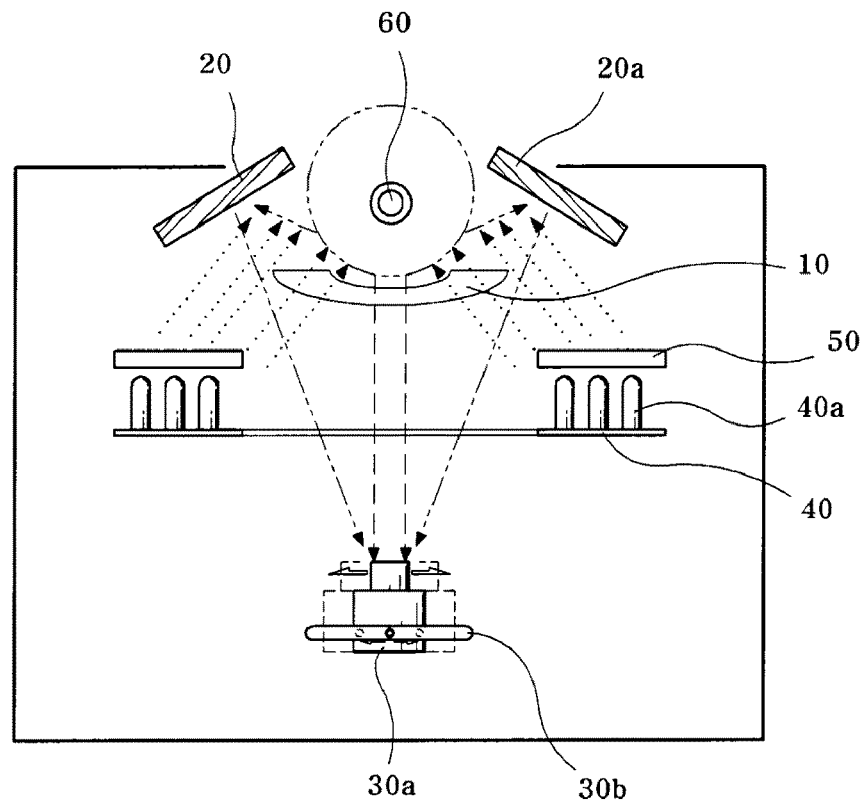
FIG. 4 is a view of a contactless fingerprint image obtaining apparatus using a mirror according to a second embodiment of the present invention.

Referring to FIGS. 2 to 4, a finger support 10 supports the finger of a user to prevent the finger from shaking.

The finger support 10 can have a shape such as a semicircular shape and a semi-elliptical shape similar to the curved surface of a finger.

A pair of mirrors 20 and 20a is installed at a slope angle above both lateral sides of the finger supported by the finger support 10, to illuminate regions of a fingerprint on left and right lateral sides.

The pair of mirrors 20 and 20a is used to obtain images of fingerprint regions on left and right lateral sides that cannot be directly shot by a camera 30a.

The single camera 30a is installed to be movable to left and right, apart from the finger by a predetermined distance below the finger supported by the finger support 10. The single camera 30a is disposed at a position allowing shooting an entire region while moving to left and right. The entire region includes a fingerprint region of a front direction coinciding with an optical axis of the camera, and fingerprint regions of left and right lateral sides that do not coincide with the optical axis.

A camera moving unit 30b moves the camera 30a to the left and right. The camera moving unit 30b can be a linear motion (LM) guide, a ball screw, or an automatic linear stage.

A lighting unit 40 is installed between the finger supported by the finger support 10 and the camera 30a, and illuminates light (e.g., green light and blue light) on the fingerprint region of the user.

Referring to FIG. 3, the lighting unit 40 includes a plurality of short wavelength band emission layers 40a circularly arranged around the finger of the user to illuminate a fingerprint region. All or some of the short wavelength band emission layers 40a can be used.

A scattering unit 50 allows light illuminated by the lighting unit 40 to be uniformly spread and distributed over the finger.

An operating switch 60 is installed in front of the finger supported by the finger support 10, and on/off-operated by a pressing operation of the finger to on/off-control the operations of the camera 30a, the camera moving unit 30b, and the lighting unit 40.

The operating switch 60 can be a micro switch and a light sensor having a curved surface shape or a circular shape of a finger end to prevent the finger from shaking.

As illustrated in FIG. 4, the contactless fingerprint image obtaining apparatus according to the second embodiment of the present invention having the above construction is used to obtain two fingerprint images, one representing the front side and the left lateral side, and the other representing the front side and the right lateral side with respect to the entire region of the fingerprint, and combine the two obtained images to finally obtain one fingerprint image representing all of the front side and the left/right lateral sides in the case where the shooting range of a shooting unit, i.e., the camera 30a is narrower than that of the camera 30 of the contactless fingerprint image obtaining apparatus according to the first embodiment, and includes a fingerprint region of the front direction coinciding with the optical axis of the camera 30a and a fingerprint region of one lateral side that does not coincide with the optical axis. The contactless fingerprint image obtaining apparatus operates in the following manner.

Referring to FIG. 4, when the operating switch 60 is pressed with the finger of the user supported by the finger support 10, the camera 30a, the camera moving unit 30b, and the lighting unit 40 start to operate.

Accordingly, short wavelength band light such as green light and blue light illuminated from the lighting unit 40 is uniformly spread by the scattering unit 50 and illuminated onto the fingerprint region of the user. The camera moving unit 30b moves the camera 30a from the left to the right, or from the right to the left along a predetermined movement direction.

At this point, as illustrated in FIG. 4, the camera 30a separated from the finger of the user by a predetermined distance moves from the left to the right, or from the right to the left to obtain two fingerprint images, one representing the front side and the left lateral side, and the other representing the front side and the right lateral side with respect to a fingerprint region of the front direction coinciding with the optical axis of the camera 30a and a fingerprint region of one lateral side that does not coincide with the optical axis, and combine the two obtained images to finally obtain one fingerprint image (refer to FIG. 6) representing all of the front side and the left/right lateral sides with respect to the entire region of the fingerprint. The above obtained fingerprint image is utilized for identification and authentication of various fields requiring security.

A third embodiment of the present invention is described in more detail with reference to the accompanying drawings.

Figure 5:
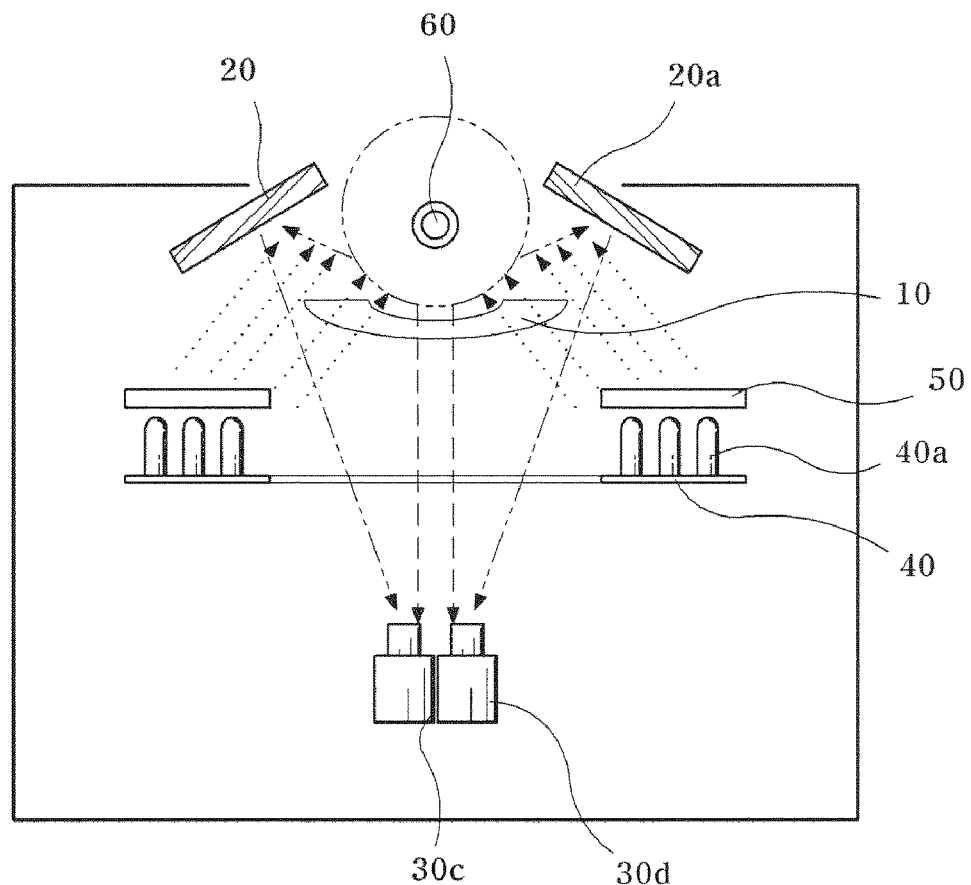
FIG. 5 is a view of a contactless fingerprint image obtaining apparatus using a mirror according to a third embodiment of the present invention.

Referring to FIGS. 2, 3, and 5, a finger support 10 supports the finger of a user to prevent the finger from shaking.

The finger support 10 can have a shape such as a semicircular shape and a semi-elliptical shape similar to the curved surface of a finger.

A pair of mirrors 20 and 20a is installed at a slope angle above both lateral sides of the finger supported by the finger support 10, to illuminate regions of a fingerprint on left and right lateral sides.

The pair of mirrors 20 and 20a is used to obtain images of fingerprint regions on left and right lateral sides that cannot be directly shot by a pair of cameras 30c and 30d.

The pair of cameras 30c and 30d is installed to be movable to left and right, apart from the finger by a predetermined distance below the finger supported by the finger support 10. The one camera 30c is disposed at a position allowing shooting a partial fingerprint region including a fingerprint region of the front direction coinciding with the optical axis of the camera 30c and a fingerprint region of a left lateral side that does not coincide with the optical axis. The other camera 30d is disposed at a position allowing shooting a partial fingerprint region including a fingerprint region of the front direction coinciding with the optical axis of the camera 30d and a fingerprint region of a right lateral side that does not coincide with the optical axis.

A lighting unit 40 is installed between the finger supported by the finger support 10 and the pair of cameras 30c and 30d, and illuminates light (e.g., green light and blue light) on the fingerprint region of the user.

Referring to FIG. 3, the lighting unit 40 includes a plurality of short wavelength band emission layers 40a circularly arranged around the finger of the user to illuminate a fingerprint region. All or some of the short wavelength band emission layers 40a can be used.

A scattering unit 50 allows light illuminated by the lighting unit 40 to be uniformly spread and distributed over the finger.

An operating switch 60 is installed in front of the finger supported by the finger support 10, and on/off-operated by a pressing operation of the finger to on/off-control the operations of the cameras 30c and 30d, and the lighting unit 40.

The operating switch 60 can be a micro switch and a light sensor having a curved surface shape or a circular shape of a finger end to prevent the finger from shaking.

As illustrated in FIG. 5, the contactless fingerprint image obtaining apparatus according to the third embodiment of the present invention having the above construction is used to obtain two fingerprint images, one representing the front side and the left lateral side, and the other representing the front side and the right lateral side with respect to the entire region of the fingerprint, and combine the two obtained images to finally obtain one fingerprint image representing all of the front side and the left/right lateral sides in the case where the shooting range of a shooting unit, i.e., each of the cameras 30c and 30d is narrower than that of the camera 30 of the contactless fingerprint image obtaining apparatus according to the first embodiment, and includes a fingerprint region of the front direction coinciding with the optical axis of the camera 30a and a fingerprint region of one lateral side that does not coincide with the optical axis. The contactless fingerprint image obtaining apparatus operates in the following manner.

Referring to FIG. 5, when the operating switch 60 is pressed with the finger of the user supported by the finger support 10, the pair of cameras 30c and 30d, and the lighting unit 40 start to operate.

Accordingly, short wavelength band light such as green light and blue light illuminated from the lighting unit 40 is uniformly spread by the scattering unit 50 and illuminated onto the fingerprint region of the user.

At this point, as illustrated in FIG. 5, the cameras 30c and 30d separated from the finger of the user by a predetermined distance obtains two fingerprint images, one representing the front side and the left lateral side, and the other representing the front side and the right lateral side with respect to a fingerprint region of the front direction coinciding with the optical axis of the camera 30c (30d) and a fingerprint region of one lateral side that does not coincide with the optical axis. The two obtained images are combined and obtained as one fingerprint image (refer to FIG. 6) representing all of the front side and the left/right lateral sides with respect to the entire region of the fingerprint. The above obtained fingerprint image is utilized for identification and authentication of various fields requiring security.

It will be apparent to those skilled in the art that the contactless fingerprint image obtaining apparatus using the mirror according to the present invention is not limited to the embodiment set forth herein but various modifications and variations can be made in the present invention. Thus, it is intended that the present invention covers the modifications and variations of this invention provided they come within the scope of the appended claims and their equivalents.

The invention claimed is:

1. A contactless fingerprint image obtaining apparatus using a mirror, the apparatus comprising:
   a finger support supporting a single finger of a user to prevent the finger from shaking;
   a pair of mirrors installed at a slope angle above both lateral sides of the single finger supported by the finger support, one of the mirrors illuminating a region of a fingerprint of the single finger on a left side, the other of the mirrors illuminating a region of the fingerprint of the single finger on a right side;
   a single camera fixedly installed apart from the finger by a predetermined distance below the finger supported by the finger support, the single camera being disposed at a position obtaining directly from the single finger an image of a front region of the fingerprint coinciding with an optical axis of the camera and simultaneously obtaining from the mirrors images of left and right lateral sides of the fingerprint that do not coincide with the optical axis;
   a lighting unit installed between the finger supported by the finger support and the camera, and illuminating light on the fingerprint region of the user, the lighting unit including a plurality of short wavelength band emission layers circularly arranged around the single finger of the user to illuminate the fingerprint region;
   a scattering unit allowing light illuminated by the lighting unit to be uniformly spread and distributed over the finger; and
   an operating switch installed in front of the finger supported by the finger support, and on/off-operated by a pressing operation of the finger to on/off-control operations of the camera and the lighting unit.

2. A contactless fingerprint image obtaining apparatus using a mirror, the apparatus comprising:
   a finger support supporting a single finger of a user to prevent the finger from shaking;
   a pair of mirrors installed at a slope angle above both lateral sides of the single finger supported by the finger support, one of the mirrors illuminating a region of a fingerprint of the single finger on a left side, the other of the mirrors illuminating a region of the fingerprint of the single finger on a right side;
   a single camera installed to be movable to left and right, apart from the finger by a predetermined distance below the finger supported by the finger support, the single camera, while moving to left and right, obtaining directly from the single finger an image of a front region of the fingerprint coinciding with an optical axis of the camera and obtaining from the mirrors images of left and right lateral sides of the fingerprint that do not coincide with the optical axis;
   a camera moving unit moving the camera to left and right;
   a lighting unit installed between the finger supported by the finger support and the camera, and illuminating light on the fingerprint region of the user, the lighting unit including a plurality of short wavelength band emission layers circularly arranged around the single finger of the user to illuminate the fingerprint region;
   a scattering unit located above the lighting unit and allowing light illuminated by the lighting unit to be uniformly spread and distributed over the finger; and
   an operating switch installed in front of the finger supported by the finger support, and on/off-operated by a pressing operation of the finger to on/off control operations of the camera, the camera moving unit, and the lighting unit.

3. A contactless fingerprint image obtaining apparatus using a mirror, the apparatus comprising:
   a finger support supporting a single finger of a user to prevent the finger from shaking;
   a pair of mirrors installed at a slope angle above both lateral sides of the single finger supported by the finger support, one of the mirrors illuminating a region of a fingerprint of the single finger on a left side, the other of the mirrors illuminating a region of the fingerprint of the single finger on a right side;
   a pair of cameras installed to be movable to left and right, apart from the finger by a predetermined distance below the finger supported by the finger support, one camera being disposed at a position obtaining directly from the single finger an image of a front region of the fingerprint coinciding with an optical axis of the camera and simultaneously obtaining from the mirrors an image of a left lateral side of the fingerprint that do not coincide with the optical axis, and the other camera being disposed at a position obtaining directly from the single finger an image of the front region of the fingerprint coinciding with the optical axis of the camera and simultaneously obtaining from the mirrors an image of a right lateral side of the fingerprint that do not coincide with the optical axis;

a lighting unit installed between the finger supported by the finger support and the pair of cameras, and illuminating light on the fingerprint region of the user, the lighting unit including a plurality of short wavelength band emission layers circularly arranged around the single finger of the user to illuminate the fingerprint region;

a scattering unit located above the lighting unit and allowing light illuminated by the lighting unit to be uniformly spread and distributed over the finger; and an operating switch installed in front of the finger supported by the finger support, and on/off-operated by a pressing operation of the finger to on/off-control operations of the cameras and the lighting unit.

4. The apparatus of claim 1, wherein the finger support comes in contact with a front side of the single finger opposite to a back side of the single finger on which a nail of the user is disposed.

5. The apparatus of claim 1, wherein the scattering unit includes a lower surface facing the lighting unit to receive light illuminated by the lighting unit and an upper surface opposite to the lower surface, the upper surface facing the finger to spread and distribute the light over the finger.

6. The apparatus of claim 2, wherein the camera moving unit comprises one of a linear motion (LM) guide, a ball screw, and an automatic linear stage.

7. The apparatus of claim 2, wherein the finger support comes in contact with a front side of the single finger opposite to a back side of the single finger on which a nail of the user is disposed.

8. The apparatus of claim 2, wherein the scattering unit includes a lower surface facing the lighting unit to receive light illuminated by the lighting unit and an upper surface opposite to the lower surface, the upper surface facing the finger to spread and distribute the light over the finger.

9. The apparatus of claim 3, wherein the finger support comes in contact with a front side of the single finger opposite to a back side of the single finger on which a nail of the user is disposed.

10. The apparatus of claim 3, wherein the scattering unit includes a lower surface facing the lighting unit to receive light illuminated by the lighting unit and an upper surface opposite to the lower surface, the upper surface facing the finger to spread and distribute the light over the finger.

* * * * *